(12) United States Patent
Nagashima et al.

(10) Patent No.: US 11,168,228 B2
(45) Date of Patent: Nov. 9, 2021

(54) INK, IMAGE FORMING METHOD, IMAGE FORMING DEVICE, AND RECORDED MATTER

(71) Applicant: RICOH COMPANY, LTD., Tokyo (JP)

(72) Inventors: Hidefumi Nagashima, Kanagawa (JP); Mio Kumai, Tokyo (JP); Yuri Haga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 146 days.

(21) Appl. No.: 16/366,464

(22) Filed: Mar. 27, 2019

(65) Prior Publication Data

US 2019/0300731 A1 Oct. 3, 2019

(30) Foreign Application Priority Data

Mar. 29, 2018 (JP) .............................. JP2018-065242
Oct. 19, 2018 (JP) .............................. JP2018-197883

(51) Int. Cl.

| | |
|---|---|
| *C09D 11/00* | (2014.01) |
| *C09D 11/322* | (2014.01) |
| *C09D 11/38* | (2014.01) |
| *C09D 11/033* | (2014.01) |
| *C09D 11/037* | (2014.01) |
| *B41M 7/00* | (2006.01) |
| *B41J 2/01* | (2006.01) |
| *B41J 11/00* | (2006.01) |
| *B41M 5/00* | (2006.01) |

(Continued)

(52) U.S. Cl.
CPC .............. *C09D 11/322* (2013.01); *B41J 2/01* (2013.01); *B41J 11/002* (2013.01); *B41M 5/0023* (2013.01); *B41M 7/009* (2013.01); *C09D 11/03* (2013.01); *C09D 11/033* (2013.01); *C09D 11/037* (2013.01); *C09D 11/102* (2013.01); *C09D 11/32* (2013.01); *C09D 11/38* (2013.01); *B32B 2307/402* (2013.01); *B32B 2307/409* (2013.01); *B32B 2307/4023* (2013.01); *B32B 2451/00* (2013.01); *B44F 1/14* (2013.01)

(58) Field of Classification Search
USPC ........................ 106/31.01, 3.13, 31.27, 31.28
See application file for complete search history.

(56) References Cited

U.S. PATENT DOCUMENTS 9,243,158 B2 * 1/2016 Toda ...................... C09D 11/38
9,321,923 B2 * 4/2016 Nakagawa ............. B41J 2/2107
(Continued)

FOREIGN PATENT DOCUMENTS

JP 2003-306625 10/2003
JP 2004-001436 1/2004
(Continued)

OTHER PUBLICATIONS

English translation of JP 2003/306625, Oct. 2003; 24 pages.*
(Continued)

*Primary Examiner* — James E McDonough
(74) *Attorney, Agent, or Firm* — Grüneberg and Myers PLLC

(57) ABSTRACT

An ink contains a water-soluble organic solvent, a glittery pigment having a median size less than 300 nm, and a polycarbonate-based urethane resin.

11 Claims, 2 Drawing Sheets

(51) Int. Cl.
*C09D 11/102* (2014.01)
*C09D 11/03* (2014.01)
*C09D 11/32* (2014.01)
*C09D 1/00* (2006.01)
*C09D 4/00* (2006.01)
*C09D 5/00* (2006.01)
*C09K 3/00* (2006.01)
*B44F 1/14* (2006.01)

(56) References Cited

U.S. PATENT DOCUMENTS

| | | | |
|---|---|---|---|
| 9,663,668 B2* | 5/2017 | Nakagawa | B41J 2/01 |
| 2003/0222945 A1 | 12/2003 | Nagata et al. | |
| 2006/0240259 A1* | 10/2006 | Toyoda | B22F 1/0059 |
| | | | 428/403 |
| 2009/0258196 A1 | 10/2009 | Nagashima et al. | |
| 2010/0196673 A1 | 8/2010 | Nagashima et al. | |
| 2013/0002776 A1 | 1/2013 | Nagashima et al. | |
| 2014/0192112 A1 | 7/2014 | Nagashima et al. | |
| 2015/0050467 A1* | 2/2015 | Nakagawa | C09D 11/322 |
| | | | 428/195.1 |
| 2015/0138284 A1 | 5/2015 | Nagashima et al. | |
| 2015/0191614 A1 | 7/2015 | Nagashima et al. | |
| 2017/0015102 A1 | 1/2017 | Nagashima et al. | |
| 2017/0121545 A1 | 5/2017 | Nagashima et al. | |
| 2018/0001669 A1* | 1/2018 | Furukawa | B41J 11/002 |
| 2018/0178538 A1* | 6/2018 | Miyazawa | C09D 11/32 |
| 2019/0276692 A1* | 9/2019 | Furukawa | B41J 2/2117 |
| 2020/0207136 A1* | 7/2020 | Miyasa | D06P 1/5271 |
| 2020/0224048 A1* | 7/2020 | Furukawa | C09D 11/322 |

FOREIGN PATENT DOCUMENTS

| | | |
|---|---|---|
| JP | 2005-036079 | 2/2005 |
| JP | 2006-299348 | 11/2006 |
| JP | 2012-035597 | 2/2012 |
| JP | 2013-177529 | 9/2013 |
| JP | 2016-156023 | 9/2016 |

OTHER PUBLICATIONS

English translation of JP 2013/177529, Sep. 2013; 25 pages.*
English translation of JP 2012/035597, Feb. 2012; 35 pages.*
English translation of JP 2005/036079, Feb. 2005; 9 pages.*
English translation of JP 2016/156023, Sep. 2016; 34 pages.*

* cited by examiner

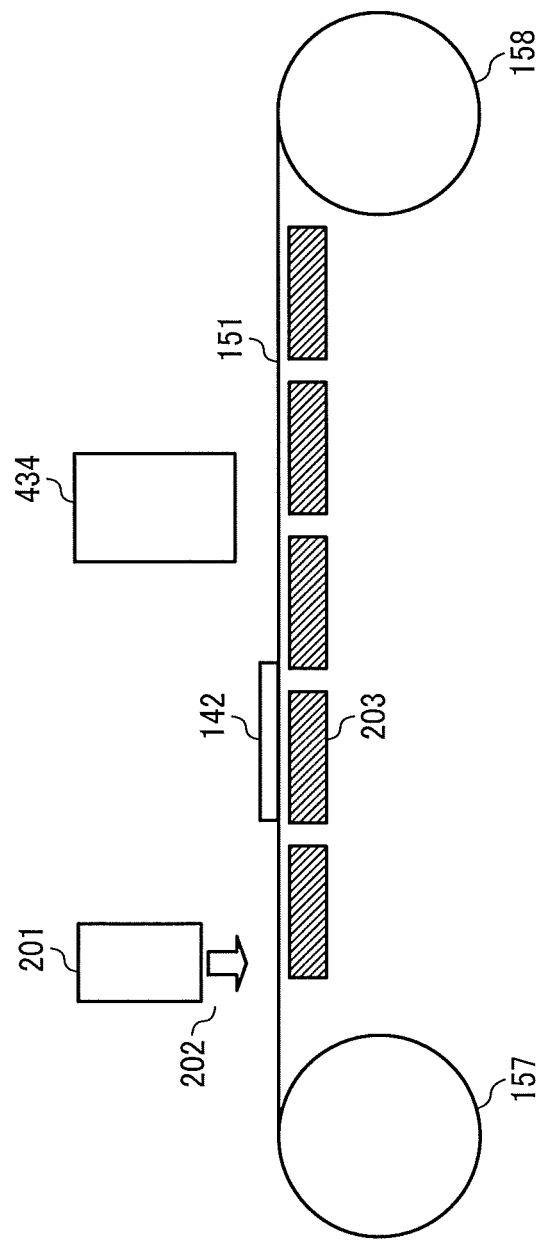

INK, IMAGE FORMING METHOD, IMAGE FORMING DEVICE, AND RECORDED MATTER

CROSS-REFERENCE TO RELATED APPLICATIONS

This patent application is based on and claims priority pursuant to 35 U.S.C. § 119 to Japanese Patent Application Nos. 2018-065242 and 2018-197883, filed on Mar. 29, 2018 and Oct. 19, 2018, respectively, in the Japan Patent Office, the entire disclosures of which are hereby incorporated by reference herein.

BACKGROUND

Technical Field

The present invention relates to an ink, an image forming method, an image forming device, and image formed matter.

Description of the Related Art

Since metallic luster provides people with gorgeous impression, such metallic luster is employed for design of various articles. For example, metallic luster of gold color is applied as symbol of wealth or metallic luster of silver color is applied to represent calm texture to various articles. To impart metallic luster to an article, an ink containing a glittery pigment with metallic luster is used. Ink having metallic luster of silver can be combined with other color inks to demonstrate various colors including gold. That is, silver ink is highly versatile. With the development of an image forming method by inkjet, there is a demand for forming an image having metallic luster by inkjet.

SUMMARY

According to embodiments of the present disclosure, provided is an ink which contains a water-soluble organic solvent, a glittery pigment having a median size less than 300 nm, and a polycarbonate-based urethane resin.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 3 is a schematic diagram illustrating an example of the heating device of an inkjet recording device.

Figure 1:
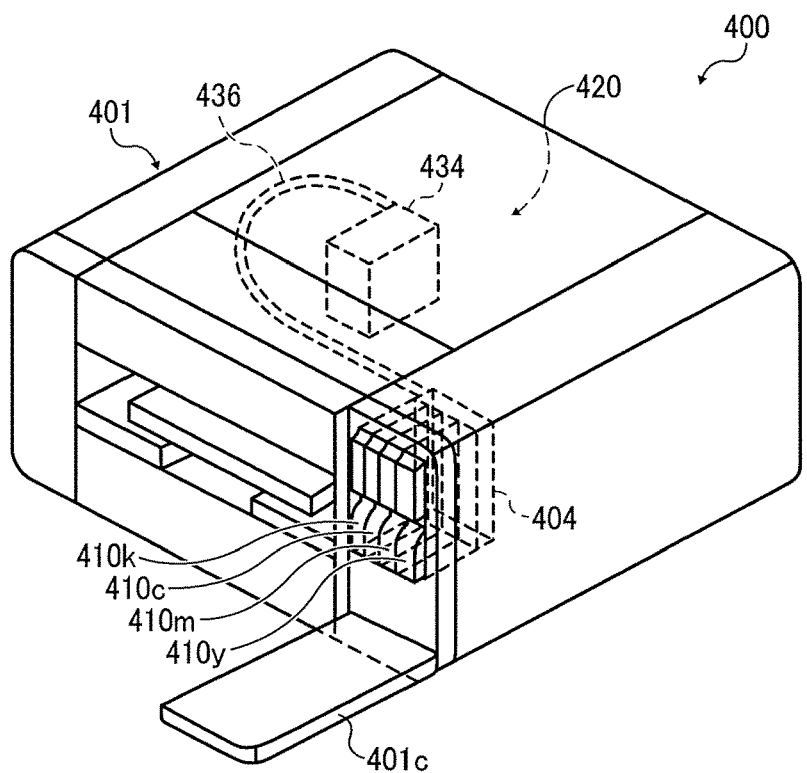
FIG. 1 is a diagram illustrating a perspective view of an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

As a method of forming a printing surface having metallic luster by an inkjet method, a printing method has been proposed which includes printing on the surface of a porous substrate with an ink composition containing a metal colloid.

An ink composition containing a glittery pigment, a compound containing a sulfur atom and a nitrogen atom or a compound containing a chlorine atom, and water has been proposed.

Ink containing metal colloid demonstrates color derived from the plasmon absorption of the metal colloid. For example, an ink containing silver colloid develops a gold of weak metallic luster or an ocher color without metallic luster. In addition, when the ink containing a glittery pigment is used for a porous recording medium, it is difficult to demonstrate metallic luster due to the absorption of the glittery pigment in the pores. Furthermore, due to its component, the ink containing a glittery pigment is likely to be discolored by light. The ink containing a glittery pigment has drawbacks regarding the luster, the chromaticity, and the light resistance.

The ink of the present disclosure has high luster level and chromaticity and excellent light resistance.

Embodiments of the present disclosure are described in detail below with reference to the accompanying drawings.

It is to be noted that it will be apparent to one of ordinary skill in the art that many suitable changes and modifications can be made to the embodiments of the present invention described below to make other embodiments, these changes and modifications are within the scope of the present invention, and the following descriptions are merely examples in preferable embodiments of the present invention and are not limiting.

The ink of the present disclosure and preferred embodiments thereof are as described in the following 1 to 11.

1. An ink contains a water-soluble organic solvent, a glittery pigment having a median size less than 300 nm, and a polycarbonate-based urethane resin.

2. The ink according to 1 mentioned above, wherein the median size is from 3 to 100 nm.

3. The ink according to 1 mentioned above, wherein the median size is from 15 to 60 nm.

4. The ink according to any one of 1 to 3 mentioned above, wherein the glittery pigment contains silver.

5. The ink according to any one of 1 to 4 mentioned above, wherein the water-soluble organic solvent contains at least one member selected from the group consisting of 1,2-propanediol, 1,3-propanediol, 1,2-butane diol, 1,3-butane diol, and 2,3-butane diol.

6. The ink according to any one of 1 to 5 mentioned above further contains an ultraviolet absorbent.

7. An image forming method includes discharging the ink of any one of 1 to 6 mentioned above to a recording medium to form an image thereon.

8. The image forming method according to 7 mentioned above further includes heating the recording medium.

9. The image forming method according to 7 or 8 mentioned above, wherein the recording medium has a coating layer,
wherein a transfer amount of water onto the surface of the coating layer is from 1 to 10 ml/m$^2$ in a contact time of 100 ms as measured by a dynamic scanning liquid absorptometer.

10. An image forming device includes a discharging device configured to discharge the ink of any one of 1 to 6 mentioned above to a recording medium and a heating device configured to heat the recording medium onto which the ink has been discharged.

11. Image formed matter includes a substrate and an image formed on the substrate with the ink of any one of 1 to 6 mentioned above.

Ink

Hereinafter, each component of the ink, such as a water-soluble organic solvent, a glittery pigment, and a polycarbonate urethane resin, will be described in detail.

Glittery Pigment

The glittery pigment has luster and examples thereof include pearl pigments and metal particles.

Specific examples of the pearl pigment include, but are not limited to, pigments having pearly luster or interference luster, such as titanium dioxide-coated mica, fish scale foil, and bismuth oxychloride. Typical examples of the metal particle are aluminum, chrome, indium, copper, gold, and silver particles. Of these, aluminum, gold, and silver are preferable in terms of safety. In particular, of various metals, silver has high whiteness. Therefore, it is possible to obtain inks of various metal colors by combining silver with other color colorants, which is more preferable. Moreover, silver is stable in water because it is not easily reactive with water. For this reason, a metal color water-based ink using silver as a glittery pigment is excellent because it reduces burden on the environment.

The median size of the glittery pigment ($D_{50}$) is preferably from 3 to less than 300 nm and more preferably from 3 to 150 nm.

Silver Particle

Silver as a glittery pigment is preferably particulate. Hereinafter, particles of silver are referred to as the silver particle. With an ink containing silver particle, an image having excellent metallic luster and light resistance can be formed.

The silver particle preferably has a median size of from 3 to less than 300 nm, more preferably from 3 to 100 nm, and furthermore preferably from 15 to 60 nm. When the median size is 3 nm or more, many silver particles are present in the image area on a recording medium. This contributes to demonstration of good metallic luster without weakening the metallic luster of image formed matter. When the median size is 15 nm or more, metallic luster is more easily developed, which is preferable. When the median size is less than 300 nm, the silver particle does not easily settle out during storage, which stabilizes discharging. This is preferable in terms of obtaining images having excellent metallic luster and light resistance. In addition, for a recording medium having a luster imparting layer (for example, platinum photo paper manufactured by ELECOM CO., LTD., which has a platinum coating, etc.), the ink of the present disclosure imparts good metallic luster even with the silver particle having a median size of less than 3 nm. This is because the silver particle enters into the ink receiving layer of a recording medium having a luster imparting layer so that a large number of nanoscale silver particles are present in the ink receiving layer. The median size can be measured by a laser diffraction type particle size distribution measuring device. As the laser diffraction type particle size distribution measuring device, for example, a particle size distribution analyzer (for example, "Microtrack UPA", manufactured by Nikkiso Co., Ltd.) based on a dynamic light scattering method can be used.

In the present disclosure, the median size of the glittery pigment may be the median diameter in the pigment dispersion or in the ink. The median size of the glittery pigment does not significantly change in the pigment dispersion or in the ink.

The proportion of the silver particle in the ink is preferably from 1.0 to 15.0 percent by mass and more preferably from 2.5 to 10.0 percent by mass in solid form in terms of storage stability and discharging stability of the ink and metallic luster.

The silver particle is preferably dispersed in an aqueous dispersion medium as silver colloid having protective colloid attached to the surface thereof. Due to this, dispersion property of the silver particle to an aqueous dispersion medium is particularly enhanced, thereby significantly improving storage stability of the ink. Silver colloid can be prepared utilizing any method. It includes, for example, a method of reducing silver ions with a reducing agent in the presence of a protective colloid in a solution containing silver ions. For manufacturing a silver colloid by this method, an addition of a surfactant to an aqueous dispersion medium at any moment before and after the reduction reaction further improves dispersion stability of the silver particle. In addition, the particle diameter of the silver particle can be controlled by the reduction reaction. That is, the particle diameter of the silver particle can be controlled by adjusting the addition rate of the reducing agent and the reaction temperature. For example, the silver particle having a smaller particle size can be obtained by reducing the addition rate of a reducing agent or lowering the solution temperature.

The protective colloid is not particularly limited as long as it is an organic substance that plays a role of protecting the surface of the silver particle. For example, an organic compound having a carboxyl group and a polymer dispersant are preferable. The organic compound having a carboxyl group and the polymer dispersant may be used alone or in combination. A combinational use is preferable to enhance dispersibility and temporal stability of the silver particle.

Organic Compound Having Carboxyl Group

The number of carboxyl groups in the organic compound having a carboxyl group as a protection colloid is not particularly limited as long as the number is at least one per molecule. As an example, the number is preferably from 1 to 10, more preferably from 1 to 5, and furthermore preferably from 1 to 3.

A representative organic compound containing a carboxyl group is a carboxyl acid. Examples of the carboxyl acid include, but are not limited to, monocarboxyl acids, polycarboxyl acids, hydroxy carboxyl acids, and oxycarboxyl acids.

Monocarboxyl acids include, for example, aliphatic monocarboxyl acids and aromatic monocarboxyl acids. Aliphatic monocarboxyl acids include saturated aliphatic monocarboxyl acids and unsaturated aliphatic monocarboxyl acids. Specific examples of the saturated aliphatic monocarboxyl acid include, but are not limited to, aliphatic monocarboxyl acids having 1 to 34 carbon atoms (preferably aliphatic monocarboxyl acids having 1 to 30 carbon atoms) such as acetic acid, propionic acid, butyric acid, caprylic acid, caproic acid, hexanoic acid, capric acid, lauric acid, myristic acid, cyclohexanecarboxyl acid, dehydrocholic acid, and cholanoic acid. Specific examples of the unsaturated aliphatic monocarboxyl acid include, but are not limited to, unsaturated aliphatic monocarboxyl acids having 4 to 34 carbon atoms (preferably unsaturated aliphatic monocarboxyl acids having 10 to 30 carbon atoms), such as oleic acid, erucic acid, linoleic acid, and abietic acid. The aromatic monocarboxyl acid includes aromatic monocarboxyl acids having 7 to 12 carbon atoms such as benzoic acid and naphthoic acid.

The polycarboxyl acid includes, but are not limited to, an aliphatic polycarboxyl acids and an aromatic polycarboxyl acid. The aliphatic polycarboxyl acid includes, but are not limited, for example, an aliphatic saturated polycarboxyl acid and an aliphatic unsaturated polycarboxyl acid.

Specific examples of the aliphatic saturated polycarboxyl acid include, but are not limited to, aliphatic saturated polycarboxyl acids having 2 to 14 carbon atoms (preferably an aliphatic saturated polycarboxyl acid having 2 to 10 carbon atoms) such as oxalic acid, malonic acid, succinic acid, glutaric acid, adipic acid, azelaic acid, sebacic acid, and cyclohexanedicarboxyl acid.

Specific examples of the aliphatic unsaturated polycarboxyl acid include, but are not limited to, aliphatic unsaturated polycarboxyl acids having 4 to 14 carbon atoms (preferably an aliphatic unsaturated polycarboxyl acid having 4 to 10 carbon atoms) such as maleic acid, fumaric acid, itaconic acid, sorbic acid, and tetrahydrophthalic acid. Aromatic monocarboxyl acid includes, but are not limited to, an aromatic polycarboxyl acid having 8 to 12 carbon atoms such as phthalic acid and trimellitic acid.

Examples of the hydroxycarboxyl acid include, but are not limited to, a hydroxymonocarboxyl acid and a hydroxypolycarboxyl acid.

Examples of the hydroxymonocarboxyl acid include, but are not limited to, an aliphatic hydroxymonocarboxyl acid and an aromatic hydroxymonocarboxyl acid.

Specific examples of the aliphatic hydroxymonocarboxyl acid include, but are not limited to, aliphatic hydroxy monocarboxyl acid having 2 to 50 carbon atoms (preferably aliphatic hydroxy monocarboxyl acid having 2 to 34 carbon atoms, and more preferably aliphatic hydroxy monocarboxyl acid having 2 to 30 carbon atoms) such as glycolic acid, lactic acid, oxybutyric acid, glyceric acid, 6-hydroxyhexanoic acid, cholic acid, deoxycholic acid, chenodeoxycholic acid, 12-oxochenodeoxycholic acid, glycocholic acid, lithocholic acid, hyodeoxycholic acid, ursodeoxycholic acid, apocholic acid, and taurocholic acid. Aromatic hydroxy monocarboxyl acids include, but are not limited to, aromatic hydroxy mono carboxyl acids having 7 to 12 carbon atoms such as salicylic acid, oxybenzoic acid, and gallic acid. Hydroxypolycarboxyl acid include, but are not limited to, aliphatic hydroxypolycarboxyl acids having 2 to 10 carbon atoms such as thalthronic acid, tartaric acid, citric acid, and malic acid.

Of these organic compounds having a carboxyl group, hydroxycarboxyl acids such as aliphatic hydroxycarboxyl acids are preferable, and of aliphatic hydroxycarboxyl acids, alicyclic hydroxycarboxyl acids or hydroxycarboxyl acids having an alicyclic skeleton are more preferable. Examples of the aliphatic hydroxymonocarboxyl acid include, but are not limited to, aliphatic hydroxymonocarboxyl acids and aliphatic hydroxypolycarboxyl acids. Examples of the alicyclic hydroxy carboxyl acid or hydroxycarboxyl acid having an alicyclic backbone include, but are not limited to, alicyclic hydroxy carboxyl acids having 6 to 34 carbon atoms (preferably alicyclic hydroxy carboxyl acids having 10 to 34 carbon atoms, and more preferably alicyclic hydroxy carboxyl acids having 16 to 30 carbon atoms).

Of the alicyclic hydroxycarboxyl acid, a polycyclic aliphatic hydroxycarboxyl acid such as cholic acid, a polycyclic aliphatic carboxyl acid such as dehydrocholic acid and colanic acid have a bulky structure and are preferable because they are significantly effective to reduce aggregation of the silver particle.

The polycyclic aliphatic carboxyl acid includes, but are not limited to, a condensed polycyclic aliphatic carboxyl acid having 10 to 50 carbon atoms, preferably a condensed polycyclic aliphatic carboxyl acid having 12 to 40 carbon atoms, more preferably condensed polycyclic aliphatic carboxyl acid having 14 to 34 carbon atoms, and furthermore preferably a condensed polycyclic aliphatic carboxyl acid having 18 to 30 carbon atoms.

The polycyclic aliphatic hydroxycarboxyl acid includes, but are not limited to, a condensed polycyclic aliphatic hydroxycarboxyl acid having 10 to 34 carbon atoms and preferably a condensed polycyclic aliphatic hydroxycarboxyl acid having 14 to 34 carbon atoms, and more preferably a condensed polycyclic aliphatic hydroxycarboxyl acid having 18 to 30 carbon atoms.

In the organic compound having a carboxyl group, the carboxyl group may form an anhydride, a hydrate, etc. In the organic compound having a carboxyl group, the carboxyl group may entirely or partially form a salt such as a salt with amine and a metal salt. In this embodiment, an organic compound in which all carboxyl groups in a molecule do not form a salt such as a salt with a basic compound such as an amine salt, i.e., an organic compound having a free carboxyl group is preferably used.

In addition, the organic compound having a carboxyl group may further have a functional group other than a carboxyl group, a metal compound, or a coordinating group for a metal particle. An example of the functional group other than the carboxyl group or the coordinating group is a functional group or a coordinating group having at least one hetero atom selected from the group consisting of a halogen atom such as a fluorine atom, a chlorine atom, a bromine atom and an iodine atom, a nitrogen atom, an oxygen atom, and sulfur atom.

The functional group having a nitrogen atom includes an amino group, a substituted amino group such as a dialkylamino group, an imino group (—NH—), a nitrogen ring group, an amido group (—CON<), a cyano group, a nitro group, etc. The nitrogen ring group includes a 5 to 8-membered nitrogen ring group such as pyridyl group, carbazole group, morpholinyl group, etc.

The functional group having an oxygen atom includes a hydroxy group, an alkoxy group, a formyl group, a carbonyl group (—CO—), an ester group (—COO—), an oxygen ring group, etc. The alkoxy group includes, for example, an alkoxy group having 1 to 6 carbon atoms such as a methoxy group, an ethoxy group, a propoxy group, and a butoxy group. The oxygen ring group includes a 5 to 8-membered oxygen ring group such as tetrahydropyranyl group.

The functional group having a sulfur atom includes, for example, a thio group, a thiol group, a thiocarbonyl group (—SO—), an alkylthio group, a sulfo group, a sulfamoyl group, and a sulfinyl group (—SO$_2$—), etc. The alkylthio group includes, for example, an alkylthio group having 1 to 4 carbon atoms such as a methylthio group and an ethylthio group.

The functional group having a nitrogen atom, the functional group having an oxygen atom, and the functional group having a sulfur atom may form a salt such as an ammonium salt. The organic compound having a carboxyl group may have one or more functional groups other than the above-mentioned carboxyl group or a coordinating group, in addition to the carboxyl group.

It is preferable that the organic compound having a carboxyl group do not have a basic group which can form a salt with a carboxyl group as the functional group or the coordinating group other than a carboxyl group.

Specific examples of the basic group capable of forming a salt with a carboxyl group include, but are not limited to, an amino group, a substituted amino group, an imino group, and an ammonium salt group.

The organic compounds having a carboxyl group may be used alone or in combination. The molecular weight of the organic compound having a carboxyl group is preferably 1000 or less, for example, in the range of from 46 to 900, more preferably 800 or less, for example in the range of from 50 to 700, and still more preferably 600 or less, for example, in the range of from 100 to 500. The pKa value of the organic compound having a carboxyl group is preferably 1 or greater (for example, 1 to about 10) and more preferably 2 or greater (for example, 2 to about 8).

Polymer Dispersant

In the present embodiment, as the protective colloid, an organic compound having a carboxyl group may be used alone, but an organic compound having a carboxyl group and a polymer dispersant may be used in combination. A protective colloid having such a combination assists in obtaining a silver colloid containing silver particles having an extremely small ratio of coarse particles. In particular, in the present embodiment, by combining specific protective colloids, coarse particles are reduced, and the storage stability of the liquid dispersion is improved even in a silver colloid in which the proportion of silver particles is large.

The polymer dispersant is not particularly limited as long as it can coat silver particles. Amphiphilic polymer dispersants or oligomer dispersants are suitable.

Known polymer dispersants used for dispersing colorants in the field of paints, inks, etc. can be used as the polymer dispersant. Examples of such dispersants include, but are not limited to, styrene resins, acrylic resins, water-soluble urethane resins, water-soluble acrylic urethane resins, water-soluble epoxy resins, water-soluble polyester resins, cellulose derivatives, polyvinyl alcohol, polyalkylene glycol, natural polymers, polyethylene sulfonates, and formalin condensates of naphthalene sulfonic acid.

Examples of the styrene resin include, but are not limited to, a styrene-(meth)acrylic acid copolymer and a styrene-maleic anhydride copolymer. An examples of the acrylic resin is a methyl(meth)acrylate-(meth)acrylic acid copolymer. Examples of the cellulose derivative include, but are not limited to, cellulose ethers including: nitrocellulose; alkyl cellulose such as ethyl cellulose; alkyl-hydroxyalkyl cellulose such as ethyl hydroxyethyl cellulose; hydroxyalkyl cellulose such as hydroxyethyl cellulose and hydroxypropyl cellulose; and carboxyalkyl cellulose such as carboxymethyl cellulose. The polyalkylene glycol includes liquid polyethylene glycol, polypropylene glycol, etc.

Natural polymers include gelatin, dextrin, etc.

The polymer dispersant include, for example, a resin containing a hydrophilic unit constituted of a hydrophilic monomer. The polymer dispersant may be an amphiphilic polymer dispersant. The hydrophilic unit may be a hydrophilic block. The resin may be a water-soluble resin or a water-dispersible resin.

Examples of the hydrophilic monomers include, but are not limited to, a carboxyl group, an acid anhydride group-containing monomer, an addition polymerization type monomer, and a condensation type monomer such as alkylene oxide. The condensation type monomer may form a hydrophilic unit through reaction with a functional group such as hydroxyl group of hydroxy group-containing monomers. The hydrophilic monomers may be used alone or in combination of two or more thereof to form a hydrophobic unit.

Examples of the carboxyl group and the acid anhydride group-containing monomer include, but are not limited to, a (meth)acrylic monomer such as acrylic acid and methacrylic acid, an unsaturated polycarboxyl acid such as maleic acid, and maleic anhydride.

Specific examples of the hydroxy group-containing monomer include, but are not limited to, hydroxyalkyl (meth)acrylate such as 2-hydroxyethyl (meth)acrylate, and vinylphenol. Alkylene oxide includes ethylene oxide, etc.

At least, the dispersant polymer includes a hydrophilic unit or a hydrophilic block. It may be a mono polymer or copolymer of a hydrophilic monomer. Also, like the styrene resins or acrylic resins specified above, it may be a copolymer of a hydrophilic monomer and a hydrophobic monomer. Copolymers of hydrophilic monomers include, for example, polyacrylic acids or salts thereof.

The hydrophobic monomer may be a nonionic monomer. The hydrophobic monomer includes, for example, a (meth)acrylic monomer such as a (meth)acrylic acid ester, styrene and styrene monomers such as α-methyl styrene, and vinyl toluene, an olefin monomer such as an olefin having 2 to 20 carbon atoms, and carboxylic acid vinyl ester monomers such as vinyl acetate and vinyl butyrate. The hydrophobic monomer may form a hydrophobic unit alone or in combination.

Specific examples of the (meth)acrylate ester include, but are not limited to, a (meth)acrylate having 1 to 20 carbon atoms such as methyl(meth)acrylate, ethyl(meth)acrylate, n-butyl(meth)acrylate, 2-ethylhexyl(meth)acrylate, lauryl (meth)acrylate, and stearyl (meth)acrylate, a cycloalkyl (meth)acrylate such as cyclohexyl(meth)arylate, an aryl (meth)acrylate such as phenyl(meth)acrylate, and an aralkyl (meth)acrylate such as benzyl(meth)acrylate and 2-phenylethyl(meth)arylate. α-olefin having 2 to 20 carbon atoms include, but are not limited to, ethylene, propylene, 1-butene, isobutylene, 1-hexene, 1-octene, and 1-dodecene.

The polymer dispersant may be, for example, a random copolymer, an alternating copolymer, a block copolymer, or a comb copolymer when it is a copolymer of a hydrophilic monomer, a hydrophobic monomer, etc. The block copolymer includes, for example, a copolymer constituted of a hydrophilic block having a hydrophilic monomer and a hydrophobic block having a hydrophobic monomer. The comb copolymer includes a comb graft copolymer. The structure of the block copolymer is not particularly limited. For example, diblock structure and a triblock structure (ABA type and BAB type) are allowed. In addition, in the comb-like copolymer, the main chain may be constituted of the hydrophilic block or the hydrophobic block or the hydrophilic block and the hydrophobic block.

The hydrophilic unit may include, for example, a condensation block such as a hydrophilic block constituted of an alkylene oxide of ethylene oxide. The hydrophilic block includes, for example, a polyethylene oxide and polyalkylene oxides such as polyethylene oxide-polypropylene oxide. The hydrophilic block and the hydrophobic block such as polyolefin block are allowed to be bonded via a coupling group such as ester bond, amide bond, ether bond, urethane bond, etc. This bonding may be formed by modifying the hydrophobic block (such as polyolefin) with a modifier, and introducing the hydrophilic block into the hydrophobic block. The modifier includes, for example, unsaturated carboxylic acids such as maleic acid and an anhydride thereof, a lactam, an amino carboxylic acid, a hydroxylamines, a diamine, etc.

In addition, the comb copolymer having the main chain constituted of a hydrophobic block is allowed to be formed through reaction or bonding between a polymer obtained from a monomer having a hydrophilic group such as hydroxyl group or carboxyl group and a condensation-based hydrophilic monomer such as ethylene oxide.

The monomer having a hydrophilic group such as a hydroxy group or a carboxyl group includes hydroxyalkyl (meth)acrylate, etc.

Moreover, in the copolymerization component, the hydrophobicity and the hydrophilicity can be balanced by using a hydrophilic nonionic monomer. Examples of hydrophilic nonionic monomers include, for example, monomers or oligomers having an alkyleneoxy unit, preferably an ethyleneoxy unit such as 2-(2-methoxyethoxy)ethyl (meth)acrylate and polyethylene glycol monomethacrylate having a number average molecular weight of about 200 to about 1000.

In addition, hydrophilicity and hydrophobicity can be balanced by modification, for example, esterification, of a hydrophilic group such as carboxyl group.

The dispersant polymer may include a functional group. As such a functional group, for example, an acid group, an acidic group, or a hydroxy group may be included. The acid group or acidic group includes, for example, a carboxyl group, an acid anhydride group, and a sulfo group. The dispersant polymer may contain such a functional group alone or in combination. Of these functional groups, the polymer dispersant preferably has an acid group and more preferably a carboxyl group.

In addition, an acid group such as a carboxyl group in the polymer dispersant may form a salt with an amine, a metal, etc. When forming a salt with an amine or a basic compound, some of the acid groups form a salt, meaning that the polymer dispersant has a free acid group, which is preferable.

In the polymer dispersant having an acid group such as carboxyl group, the acid value is preferably 1 mgKOH/g or more, for example, 2 to 100 mgKOH/g, more preferably 3 mgKOH/g or more, for example 4 to 90 mgKOH/g, more preferably, 5 mgKOH/g or more, for example, 6 to 80 mgKOH/g, and more preferably 7 mgKOH/g or more, for example, 8 to 70 mgKOH/g. Note that, in the dispersant polymer having an acid group, the amine value is allowed to be zero. In the embodiment, zero also includes an amount that can not be detected by measurement.

In the dispersant polymer, the site of the functional group is not particularly limited. It can be at the main chain or the side chain and both of the main chain and the side chain. Such a functional group may be, for example, a hydrophilic monomer such as a hydroxy group or a functional group derived from a hydrophilic unit, or may be introduced into the polymer dispersant by copolymerization using a monomer having a functional group such as maleic anhydride.

These polymer dispersants can be used alone or in combination.

In addition, the polymer dispersant is available on the market. Specific examples of the polymer dispersant or a dispersant composed of at least amphiphatic dispersant available on the market include, but are not limited to, Solsperse series (manufactured by Avecia Inkjet Limited) such as Solsperse 13240, Solsperse 13940, Solsperse 32550, Solsperse 31845, Solsperse 24000, Solsperse 26000, Solsperse 27000, Solsperse 28000, and Solsperse 41090; DISPERBYK series (manufactured by Byk Chemie GmbH) such as DTSPERBYK 160, DTSPERBYK 161, DTSPERBYK 162, DISPERBYK 163, DTSPERBYK 164, DISPERBYK 166, DISPERBYK 170, DISPERBYK 180, DISPERBYK 182, DISPERBYK 184, DISPERBYK 190, DISPERBYK 191, DISPERBYK 192, DISPERBYK 193, DISPERBYK 194, DISPERBYK 2001, and DISPERBYK 2050; EFKA-46, EFKA-47, EFKA-48, EFKA-49, EFKA-1501, EFKA-1502, EFKA-4540, EFKA-4550, Polymer 100, Polymer 120, Polymer 150, Polymer 400, Polymer 401, Polymer 402, Polymer 403, Polymer 450, Polymer 451, Polymer 452, and Polymer 453 (available from EFKA Chemical Co., Ltd.); AJISPER series (manufactured by Ajinomoto Fine-Techno Co., Inc.) such as AJISPER PB711, AJISPER PA111, AJISPER PB811, AJISPER PB821, and AJISPER PW911, FLOWLEN series (manufactured by KYOEISHA CHEMICAL Co., LTD.) such as FLOWLEN DOPA-158, FLOWLEN DOPA-22, FLOWLEN DOPA-17, FLOWLEN TG-700, FLOWLEN TG-720W, FLOWLEN-730W, FLOWLEN-740W, and FLOWLEN-745W; and JONCRYL® series (manufactured by Johnson Polymer) of JONCRYL® 678, JONCRYL® 679, and JONCRYL® 62. Of these, specific examples of the polymer dispersant having an acid group include, but are not limited to, DISPERBYK 190 and DISPERBYK 194.

The number average molecular weight of the polymer dispersant is, for example, from 1,500 to 100,000, preferably from 2,000 to 80,000, more preferably from 2,000 to 60,000, furthermore preferably from 3,000 to 50,000, still furthermore preferably from 5,000 to 30,000, and particularly preferably from 7,000 to 20,000.

Due to inclusion of a glittery pigment and a polycarbonate-based urethane resin, the ink can strike a balance between metallic luster and abrasion resistance of the coating film. Furthermore, discoloration can be reduced. In addition, in this item, the polycarbonate-based urethane resin particle is represented as "resin particle", unless otherwise specified.

Resin Particulate

The resin particle enhances dispersibility of the particles in an ink, also increases hardness of the ink coating film, and improves abrasion resistance thereof. The minimum film-forming temperature (hereinafter also referred to as MFT) of the resin particles contained in the ink is preferably from 50 to 80 degrees C. because metallic luster is obtained, adhesion between the coating film of the ink and a recording medium is obtained, and good abrasion resistance is obtained. By adding resin particles having a minimum film forming temperature of from 50 to 80 degrees C. to the ink, an ink having a minimum film forming temperature of 50 to 80 degrees C. can be easily manufactured.

The minimum film forming temperature is the lowest temperature below which transparent continuous film is not formed when resin particles are extended and flow on a metal plate made of such as aluminum while raising the temperature. At temperatures lower than the minimum film forming temperature, the water-insoluble resin becomes white powder. Specifically, MFT is the value measured by a commercially available MFT measurement device such as film forming temperature test device (manufactured by IMOTO MACHINERY CO., LTD.) and a TP-801 MFT Tester (manufactured by TESTER SANGYO CO, LTD.).

In the present embodiment, MFT is the measured value using a resin particle having a resin solid portion of 30 percent by mass.

The median size of the resin particles contained in the ink is from 10 to 30 nm.

When the median size is in this range, the coating film can strike a balance between metallic luster and abrasion resistance and reduce discoloration.

In the present disclosure, a polycarbonate-based urethane resin is used as the resin particle. Due to the high agglomeration force of a carbonate group, the polycarbonate-based urethane resin has excellent water resistance, heat resistance, abrasion resistance, weather resistance, and scratch resistance of an image. Therefore, recorded matter with fastness can be obtained.

In addition to the urethane resin, inclusion of acrylic resin enhances light resistance.

The proportion of the resin particle in ink is from 0.01 to 5.0 percent by mass and more preferably from 0.05 to 2.0 percent by mass. Within this range, storage stability, discharging stability, and metallic luster of the ink are improved, and discolorization is reduced.

The resin particle may be a forced emulsifying type used together with a dispersant, but a so-called self-emulsifying type having an anionic group in the molecular structure is preferable in terms of preventing the dispersing agent from remaining in the coating film and lowering the strength. The acid value of the anionic group of the resin particle of the self-emulsification type is preferably from 5 to 100 mgKOH/g and more preferably from 5 to 50 mgKOH/g in terms of water dispersibility, abrasion resistance, and chemical resistance.

Specific examples of the anionic group in the self-emulsifying resin particle include, but are not limited to, a carboxyl group, a carboxylate group, a sulfonic acid group, and a sulfonate group. Of these, a carboxylate group or a sulfonate group which is partially or entirely neutralized by a basic compound, etc. is preferable to maintain good water dispersion stability. In order to introduce such an anionic group into the resin, a monomer having an anionic group may be polymerized to obtain the resin.

To manufacture an aqueous dispersion of the resin particle having an anion group, for example, it is possible to add a basic compound to neutralize the anion group to a mixture of water and resin particles having an anion group.

Specific examples of the basic compound to neutralize the anionic group include, but are not limited to, organic amines such as ammonium, triethyl amine, pyridine, and morpholine, alkanol amines such as monoethanol amine, and basic metal salt compounds containing Na. K. Li, Ca, etc. These can be used alone or in combination.

As the dispersant utilized to manufacture an aqueous dispersion using the resin particle of forced emulsification type, for example, a surfactant such as a nonionic surfactant and an anionic surfactant can be used. These can be used alone or in combination. Of these, nonionic surfactants are preferred in terms of water resistance.

Specific examples of the nonionic surfactants include, but are not limited to, polyoxyethylene alkyl ethers, polyoxyethylene alkylene alkyl ethers, polyoxyethylene derivatives, polyoxyethylene aliphatic acid esters, polyoxyethylene polyol aliphatic acid esters, polyoxyethylene propylene polyols, sorbitan aliphatic acid esters, polyoxyethylene curable ricinus, polyoxyalkylene polycyclic phenyl ethers, polyoxyethylene alkyl amines, alkyl alkanol amides, and polyalkylene glycol (meth)acrylates. These can be used alone or in combination. Of these, polyoxyethylene alkylethers, polyoxyethylene aliphatic acid esters, polyoxyethylene sorbitan aliphatic acid esters, and polyoxyethylene alkylamines are preferable.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxyl acid salts, aliphatic acid salts, naphthalene sulfonic acid formalin condensed compounds, alkyl amine salts, quaternary ammonium salts, alkyl betaines, and alkyl amine oxides. These can be used alone or in combination. Of these, polyoxyethylene alkyl ether sulfuric acid salts and sulfosuccinic salts are preferable.

The proportion of the surfactant to the total amount of the ink is preferably from 0.1 to 30 percent by mass and more preferably from 5 to 20 percent by mass. When the proportion is within the range of from 0.1 to 30 percent by mass, a film of the resin particle is suitably formed and ink having excellent attachability and water resistance can be obtained so that recorded matter is free of blocking.

Organic Solvent

There is no specific limitation to the organic solvent for use in the ink. For example, water-soluble organic solvents can be used. Examples of the water-soluble organic solvent are polyols, ethers such as polyol alkylethers and polyol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 1,2-butane diol, 1,3-butane diol, 2,3-butane diol, 3-methyl-1,3-butane diol, triethylene glycol, polyethylene glycol, polypropylene glycol, 1,5-pentane diol, 1,6-hexane diol, glycerin, 1,2,6-hexane triol, 2-ethyl-1,3-hexane diol, ethyl-1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethyl ene glycol monomethyl ether, propylene glycol monoethyl ether, and dipropylene glycol monomethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethylimidazolidinone, E-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate.

It is preferable that the ink of the present embodiment contain an organic solvent having a boiling point of 250 degrees C. or lower, in order to obtain good drying property as well as serving as a humectant. The organic solvent contained in the ink of the present embodiment is preferably composed of only a water-soluble organic solvent having a boiling point of 250 degrees C. or lower, more preferably only a water-soluble organic solvent having a boiling point lower than 220 degrees C. Inclusion of a water-soluble organic solvent having a boiling point of 250 degrees C. or lower contributes to obtaining an ink having good drying properties and high luster.

Of the water-soluble organic solvent having a boiling point of 250 degrees C. or lower, it is preferable to contain at least one compound selected from the group consisting of 1,2-propanediol, 1,3-propanediol, 1,2-butane diol, 1,3-butane diol, and 2,3-butane diol. Such water-soluble organic solvents have good compatibility with polycarbonate-based urethane resins, so that ink having more excellent layer forming property and a high level of luster is easily obtained.

The proportion of the water-soluble organic solvent contained in the ink is preferably from 20 to 70 percent by mass and more preferably from 30 to 60 percent by mass. When the total proportion is 20 percent by mass or more, the ink is not easily dried, so that sufficient discharging stability is obtained. When the proportion is 70 percent by mass or less, viscosity is not excessively high, and discharging stability can be obtained.

Water

Water is a main solvent or dispersion medium of the ink. As water, pure water and hyperpure water such as deionized water, ultrafiltered water, reverse osmosis water, and distilled water are preferable to remove ionic impurities as much as possible. In addition, it is preferable to use water sterilized through ultraviolet irradiation or addition of hydrogen peroxide to prevent incidence of mold or bacteria for an extended period of time of storage. The proportion of water in the ink is not particularly limited and can be suitably selected to suit to a particular application. For example, it is preferably from 25 to 75 percent by mass and more preferably from 30 to 60 percent by mass. Within this range, the environmental burden of the ink is reduced.

Ultraviolet Absorbent

Next, the ultraviolet absorbent for use in the present disclosure is described. Such an ultraviolet absorbent is added to improve image fatness and in particular discolorization of the silver particle. In particular, in combination with a polycarbonate urethane resin, discolorization is further prevented so that a more natural silver color is demonstrated. Although the mechanism is not clear, it is inferred that the protection state of the periphery of silver particle becomes more robust by holding the ultraviolet absorbent simultaneously with the silver particle held by the high cohesive force of the carbonate group. There is no specific limit to the ultraviolet absorbent and specific examples thereof include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers, oxalic acid anilide-based ultraviolet absorbents, and triazine-based ultraviolet absorbers. Details are as follows.

Specific examples of the benzophenone-based ultraviolet absorbents include, but are not limited to, 2-hydroxy-4-n-octoxybenzophenone, 2-hydroxy-4-n-dodecyloxy benzophenone, 2,4-dihydroxy benzophenone, 2-hydroxy-4-methoxybenzophenone, and 2,2',44'-tetrahydroxy benzophenone.

Specific examples of the benzotriazole-based ultraviolet absorbents include, but are not limited to, 2-(2'-hydroxy-5'-tert-octylphenyl)benzo triazole, 2-(2'-hydroxy-5'-methylphenyl)benzo triazole, 2-(2'-hydroxy-4'-octoxyphenyl) benzo triazole, and 2-(2'-hydroxy-3'-tert-butyl-5'-methylphenyl)-5-chlorobenzo triazole.

Specific examples of the salicylate-based ultraviolet absorbents include, but are not limited to, phenyl salicylate, p-tert-butylphenyl salicylate, and p-octylphenyl salicylate.

Specific examples of the cyanoacrylate-based ultraviolet absorbents include, but are not limited to, ethyl-2-cyano-3, 3'-diphenyl acrylate, methyl-2-cyano-3-methyl-3-(p-methoxyphenyl)acrylate, and butyl-2-cyano-3-methyl-3-(p-methoxyphenyl)acrylate.

Specific examples of the nickel complex salt-based ultraviolet absorbents include, but are not limited to, nickel-bis (octylphenyl)sulfide, 2,2'-thiobis(4-tert-octyl ferrate)-n-butylamine nickel (II), 2,2'-thiobis(4-tert-octyl ferrate)-2-ethylhexyl amine nickel (II), and 2,2'-thiobis(4-tert-octyl ferrate)triethanol amine nickel (II).

The triadine-based ultraviolet absorbent is available on the market. Specific examples include, but are not limited to, TINUVIN 400-DW, TINUVIN 477-DW, and TINUVIN 479-DW (all manufactured by BASF).

Those ultraviolet absorbents can be used alone or in combination.

The proportion of the ultraviolet absorbent in the ink is preferably from 0.5 to 20 percent by mass and more preferably from 1 to 15 percent by mass as the effective component. When the content is 0.5 percent by mass or more, the addition effect of the absorbent is sufficiently demonstrated. In addition, if the proportion is 20 percent by mass or less, no crystal of an ink precipitates around a nozzle when the ink is dried.

Additive

The ink may further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment. Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxyl acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

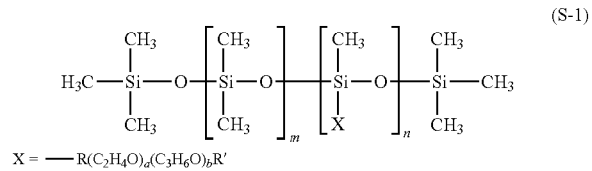

$X = \text{---} R(C_2H_4O)_a(C_3H_6O)_bR'$

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Chemie GmbH), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable, Specific examples of the fluorochemical surfactants include, but are not limited to, perfluoroalkyl phosphoric acid ester compounds, adducts of perfluoroalkyl ethylene oxide, and polyoxyalkylene ether polymer compounds having perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable, (F-1)

$CF_3CF_2(CF_2CF_2)_m\text{---}CH_2CH_2O(CH_2CH_2O)_n H$  Chemical formula F-1

In the compound represented by Chemical formula F-1, m is preferably 0 or an integer of from 1 to 10 and n is preferably 0 or an integer of from 1 to 40.

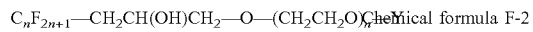

$C_nF_{2n+1}\text{---}CH_2CH(OH)CH_2\text{---}O\text{---}(CH_2CH_2O)_aY$  Chemical formula F-2

In the compound represented by the chemical formula F-2, Y represents H or $C_mF_{2m+1}$, wherein represents an integer of from 1 to 6, or $CH_2CH(OH)CH_2\text{---}C_mF_{2m+1}$, where m represents an integer of from 4 to 6, or $C_pH_{2p+1}$, where p is an integer of from 1 to 19. "n" represents an integer of from 1 to 6 "a" represents an integer of from 4 to 14

As the fluorochemical surfactant, products available on the market may be used.

Specific examples include, but are not limited to, SUR-FLON S-111, S-112, S-113, S-121, S-131, S-132, S-141, and S-145 (all manufactured by ASAHI GLASS CO., LTD.); FLUORAD FC-93, FC-95, FC-98, FC-129, PC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

The pH regulator has no particular limit as long as it can control pH to not lower than 7.

Specific examples include, but are not limited to, amines such as diethanol amine and triethanol amine.

Method of Manufacturing Ink

An example of the method of manufacturing the ink includes stirring and mixing the water, the organic solvent, a first resin particle, a second resin particle, and other optional components.

The ingredients mentioned above are mixed and stirred by, for example, a sand mill, a homogenizer, a ball mill, a paint shaker, an ultrasonic dispersing device, a stirrer having a typical stirring wing, a magnetic stirrer, and a high speed dispersing device.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO LTD.). The measuring conditions are as follows:

Standard cone rotor (1°34'×R24)
Sample liquid amount: 1.2 mL
Rotational frequency: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Recording Medium

The recording medium is not particularly limited. Plain paper, gloss paper, special paper, cloth, etc. are usable. Also, good images can be formed on a non-permeable substrate. The non-permeable substrate has a surface with low moisture permeability and low absorbency and includes a material having myriad of hollow spaces inside but not open to the outside. To be more quantitative, the substrate has a water-absorption amount of 10 mL/m$^2$ or less between the start of the contact and 30 msec$^{1/2}$ later according to Bristow method. For example, plastic films such as vinyl chloride resin film, polyethylene terephthalate (PET) film, polypropylene film, polyethylene film, and polycarbonate film are suitably used as the non-permeable substrate. In addition, the transfer amount of water onto the surface of the coating layer of the recording medium is from 1 to 10 ml/m$^2$ in a contact time of 100 ms as measured by a dynamic scanning liquid absorptometer.

The recording medium may be a permeable recording medium or a non-permeable recording medium. Of these, a vinyl chloride recording medium of the permeable recording media is preferable. As the non-permeable substrate, a non-porous substrate is suitably used.

Ink Cartridge

The ink cartridge for use in the present embodiment has a container to accommodate the ink of the present embodiment. The ink cartridge has, in addition to the container to accommodate the ink, other optional members appropriately selected as necessary.

There is no specific limit to the container. It is possible to select any form, any structure, any size, and any material. For example, a container having at least an ink bag formed of aluminum laminate film, a resin film, etc. can be suitably used.

Inkjet Recording Method and Inkjet Recording Device

The inkjet recording device in the present embodiment has an ink discharging device, and other optional devices such as a heating device, which are appropriately selected as necessary. The inkjet recording method of the present embodiment has an ink discharging process and other optional processes such as a heating process, which are appropriately selected as necessary.

The inkjet recording method of the present embodiment can be suitably executed by the inkjet recording device of the present embodiment. The ink discharging process is suitably conducted by the ink discharging device. The heating process can be suitably conducted by the heating device. In addition, the other processes are suitably conducted by the other corresponding devices.

Ink Discharging Process and Ink Discharging Device

In the ink discharging process, the ink discharging device applies a stimulus to the ink of the present embodiment to discharge the ink to form an image. The ink discharging device has no particular limit. For example, an inkjet head is usable.

The inkjet head includes a piezoelectric element head of discharging ink droplets by transforming a diaphragm forming the wall of the ink flow path using a piezoelectric element as a pressure generating device to press the ink in the ink flow path, a thermal type inkjet head of producing bubbles by heating ink in the ink flow path with a heat element, and an electrostatic type inkjet head of discharging ink droplets by changes of the volume in the ink flow path caused by transforming a diaphragm that forms the wall surface of the ink flow path by an electrostatic force generated between the diaphragm and the electrode while the diaphragm and the electrode are disposed facing each other.

Such a stimulus can be generated by a stimulus generating device. The stimulus mentioned above has no specific limit and can be suitably selected to a particular application. For example, heat energy (temperature), kinetic energy such as pressure and vibration, and light can be suitably used as the stimulus. These can be used alone or in combination. Of these, heat and pressure are preferable.

There is no specific limit to how the ink is discharged, which differs depending on the kind of the stimulus. For example, in the case in which the stimulus is "heat", a method can be used in which thermal energy corresponding to recording signals is applied by, for example, a thermal head to generate foams in the ink in an inkjet head and the ink is discharged and sprayed as droplets from the nozzles of the recording head by the pressure of the foam. In addition, when the stimulus is "pressure", for example, a method can be used in which a voltage is applied to a piezoelectric element attached to the site referred to as a pressure chamber located in the ink flow path in an inkjet head to bend the piezoelectric element. This contracts the volume of the pressure chamber, thereby jetting and spraying the ink from the orifices of nozzles of the inkjet head as liquid droplets.

The ink droplet to be discharged preferably has, for example, a size of from 3 to 40 pL, a discharging speed of from 5 to 20 m/s, a drive frequency of 1 kHz or greater, and a resolution of 300 dpi or greater.

Heating Process and Heating Device

In the heating process, the heating unit heats the recording medium on which an image is recorded. Quality images can be recorded on non-permeable recording media as the recording media by the inkjet recording method. However, it is preferable to heat the non-permeable recording medium after recording in order to achieve better abrasion resistance with better quality images, form images with better attachability to the recording media, and maintain performance in high performance recording conditions. This heating process conducted after recording accelerates film forming of the resin contained in an ink so that image hardness of recorded matter can be enhanced.

As the above-mentioned heating device, many known devices can be used. For example, forced air heating using a warm air generating device, radiation heating, conductive heating, high frequency drying, microwave drying are suitable. These can be used alone or in combination.

The heating temperature can be changed depending on the kind and amount of a water-soluble organic solvent contained in ink and the lowest-layer film forming temperature of added resin particles. It also can be changed depending on the kind of a recording medium to be printed.

The heating temperature is preferably high enough not to damage an impermeable recording medium in terms of drying property and film forming temperature, specifically, 40 to 120 degrees C. and more preferably from 50 to 90 degrees C. When the heating temperature is in the range of from 40 to 120 degrees C., damage to a non-permeating recording medium due to heat can be prevented and non-discharging ascribable to a heated inkjet head can be reduced.

Other Processes and Other Devices

Other processes include, but are not limited to, stimulation generation process by a stimulation generation device and control process by a control device.

Specific examples of the stimulus generating device include, but are not limited to, a heater, a pressurizing device, a piezoelectric element, a vibrator, an ultrasonic oscillator, and light. To be more specific, there are a piezoelectric actuator as the piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that utilizes an electrostatic force. There is no specific limit to the control device as long as the device can control the behavior of each device. Any control device can be suitably selected and used. For example, devices such as a sequencer and a computer can be used.

The inkjet recording method of the present embodiment may include applying the ink containing the glittery pigment of the present embodiment and other optional inks such as a clear ink containing no pigment and an ink containing a colorant other than the glittery pigment to a recording medium. In this example, such inks can be partially or entirely applied to the surface of the recording medium. When the ink containing the glittery pigment of the present embodiment is partially applied to a recording medium, for example, it is possible to apply the ink to the same site or partially overlapped site where other inks are applied for recording.

The other inks include black (K), cyan (C), magenta (M), and yellow (Y) inks. In the present embodiment, an ink containing the above-mentioned glittery pigment is used instead of or in addition to these inks.

How to use the ink is not limited to the inkjet recording method.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

Recorded Matter

The ink recorded matter of the present disclosure includes a recording medium and an image formed on the recording medium with the ink of the present disclosure. The recorded matter is obtained by an inkjet recording device executing an inkjet recording method.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices). In the present disclosure, the recording device and the recording method respectively represent a device capable of discharging ink, various processing liquids, etc., to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as AO and a continuous printer capable of using continuous paper rolled up in a roll-like form as a recording medium.

Figure 2:
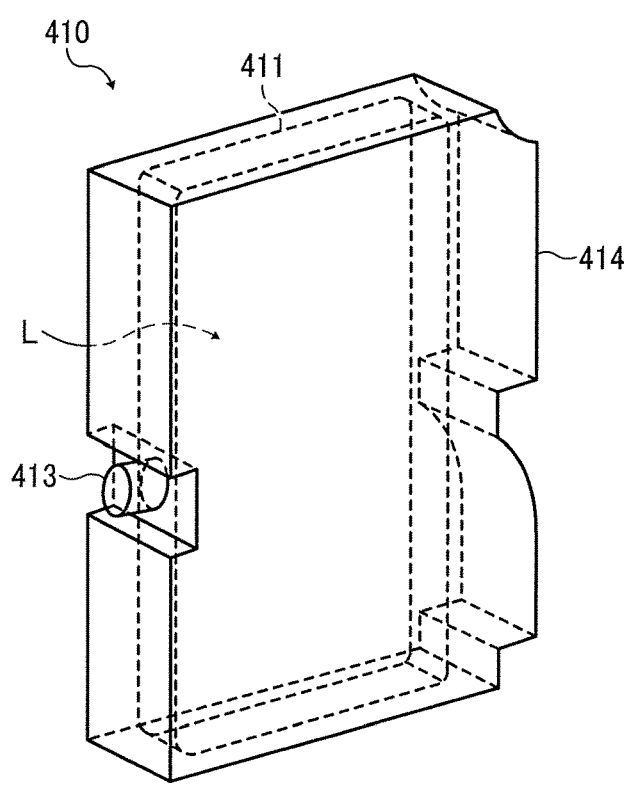
FIG. 2 is a diagram illustrating a perspective view of an example of a main tank.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410*k*, 410*c*, 410*m*, and 410*y*) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401*c* is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

The inkjet recording device illustrated in FIG. 1 preferably has a heating device. FIG. 3 is a schematic diagram illustrating an example of the heating device of the inkjet recording device illustrated in FIG. 1 and FIG. 2. The rotation of rollers 157 and 158 moves a recording medium 142 on a conveyor belt 151 in the direction from the roller 158 to the roller 157. A heating fan 201 as a heating unit blows warm air 202 on the image formed on the recording medium 142 to heat it. A group of heaters 203 are disposed on the reverse side of the conveyor belt 151 regarding the recording medium 142 to apply heat to the recording medium 142 having the image thereon.

Image forming, recording, printing, print, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. "Parts" in Examples represent "parts by weight".

First, the method for manufacturing a pigment dispersion will be described.

Preparation of Silver Colloid Particle Liquid Dispersion 1

66.8 g of silver nitrate, 7.2 g of a polymer dispersant having a carboxyl group (DISPERBYK-190, manufactured by BYK Chemie GmbH) and 1.8 g of cholic acid (manufactured by Wako Pure Chemical Industries, Ltd.) were charged into 100 g of deionized water followed by vigorous stirring to obtain a suspension. The solvent in DISPERBYK-190 is water. DISPERBYK-190 has a non-volatile component of 40 percent, an acid value of 10 mgKOH/g, and an amine value of zero.

To this suspension, 100 g of dimethylaminoethanol (manufactured by Wako Pure Chemical Industries, Ltd.) was gradually added in such a manner that the water temperature did not surpass 50 degrees C. followed by heating and stirring for three hours in a water bath at a water temperature of 50 degrees C. The reaction solution obtained by heating and stirring was filtered with a glass filter (GC-90, pore size 0.8 micrometer, manufactured by ADVANTEC CO., LTD.) to obtain a silver colloid particle liquid dispersion 1 containing silver of 15 percent.

The particle size distribution of the thus-obtained silver colloid particle liquid dispersion 1 was measured by a particle size analyzer (Nanotrac Wave-EX150, manufactured by NIKKISO CO., LTD.). The median size (DO was 5 nm and 90 percent cumulative volume particle diameter ($D_{90}$) was 30 nm.

Preparation of Silver Colloid Particle Liquid Dispersion 2

A silver colloid particle liquid dispersion 2 was obtained in the same manner as in Preparation of Silver Colloid Particle Liquid Dispersion 1 except that the addition speed of dimethylaminoethanol and the water temperature were adjusted so as to obtain the particle diameter of silver particles shown in Table 1 below. The particle size distribution of the thus-obtained silver colloid particle liquid dispersion 1 was measured by a particle size analyzer (Nanotrac Wave-EX150, manufactured by NIKKISO CO., LTD.). The median size ($D_{50}$) was 150 nm and 90 percent cumulative volume particle diameter ($D_{90}$) was 300 nm.

Preparation of Silver Colloid Particle Liquid Dispersion 3

A silver colloid particle liquid dispersion 3 was obtained in the same manner as in Preparation of Silver Colloid Particle Liquid Dispersion 1 except that the addition speed of dimethylaminoethanol and the water temperature were adjusted so as to obtain the particle diameter of silver particles shown in Table 1 below. The particle size distribution of the thus-obtained silver colloid particle liquid dispersion 1 was measured by a particle size analyzer (Nanotrac Wave-EX150, manufactured by NIKKISO CO., LTD.). The median size ($D_{50}$) was 15 nm and 90 percent cumulative volume particle diameter ($D_{90}$) was 60 nm.

Preparation of Silver Colloid Particle Liquid Dispersion 4

A silver colloid particle liquid dispersion 4 was obtained in the same manner as in Preparation of Silver Colloid Particle Liquid Dispersion 1 except that the addition speed of dimethylaminoethanol and the water temperature were adjusted so as to obtain the particle diameter of silver particles shown in Table 1 below. The particle size distribution of the thus-obtained silver colloid particle liquid dispersion 1 was measured by a particle size analyzer (Nanotrac Wave-EX150, manufactured by NIKKISO CO., LTD.). The median size ($D_{50}$) was 60 nm and 90 percent cumulative volume particle diameter ($D_{90}$) was 120 nm.

Preparation of Polycarbonate-based Urethane Resin Emulsion A 1,500 g of polycarbonate diol (reaction product of 1,6-hexane diol and dimethyl carbonate), 220 g of 2,2-dimethylol propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60 degrees C. to dissolve DMPA.

Thereafter, 1,445 g of 4,4'-dicyclohexyl methane diisocyanate and 2.6 g of dibutyl tin laurylate (catalyst) were added thereto and the resultant was heated to 90 degrees C. to complete urethanification reaction in five hours. As a resultant, an isocyanate-terminated urethane prepolymer was obtained. Next, the reaction mixture containing the isocyanate-terminated urethane prepolymer was cooled down to 80 degrees C. 4340 g was extracted from a resultant mixture obtained by admixing 149 g of triethylamine with the reaction mixture and thereafter added to 5400 g of water and 15 g of triethylamine while being vigorously stirred. Thereafter, 1,500 g of ice and 626 g of 35 percent 2-methyl-1,5-pentane diamine aqueous solution were added to conduct chain elongation reaction followed by distillation away of the solvent in such a manner that the solid portion concentration was 30 percent to obtain polycarbonate-based urethane resin particle liquid dispersion A. The particle size distribution of the thus-obtained polycarbonate-based urethane resin particle liquid dispersion A was measured by a particle size analyzer (Nanotrac Wave-EX150, manufactured by NIKKISO CO., LTD.). The median size ($D_{50}$) was 20 nm.

Preparation of Ink

Example 1

The materials prepared as described above was mixed and stirred according to the following formulation followed by filtration by 0.2 μm polypropylene filter to obtain a silver ink.

| | |
|---|---|
| Silver colloid particle dispersion 1: | 15 parts |
| Polycarbonate-based urethane resin particle liquid dispersion A: | 7.5 parts |
| Acrylic-based resin emulsion (VONCOAT R-3380-E, manufactured by DIC Corporation): | 2 parts |
| Surfactant (Sophanol EP-5035, polyoxyalkylene alkyl ether, manufactured by Nippon Catalysts Co., Ltd.): polyoxyalkylene alkyl ether | 2 parts |
| 2,3-butane diol (boiling point of 183 degrees C.): | 20 parts |
| Diethylene glycol n butyl ether (boiling point of 230 degrees C.): | 15 parts |
| Preservatives and fungicides (PROXEL LV, benzisothiazolin-3-one, manufactured by Avecia Inkjet Limited): | 0.1 parts |
| Deionized water: | 38.4 parts |

Image Forming

Using an inkjet printer (IPSiO GXe 5500, manufactured by Ricoh Co., Ltd.), the ink of Example 1 was discharged onto a recording medium at 25 degrees C. to obtain a 3 cm square solid image as recorded matter. As the recording medium, glossy paper for IJ (Platinum Photo Paper EJK-QTA420, manufactured by ELECOM CO., LTD.) was used.

The thus-obtained solid image was evaluated for degree of gloss, chromaticity, and fire resistance by the evaluation method described later.

Examples 2 to 11 and Comparative Examples 1 and 3

The inks of Examples 2 to 11 and Comparative Examples 1 to 3 were prepared in the same manner as in Example 1 except that the type or amount of water, water-soluble organic solvent, water-dispersible resin, or pigment liquid dispersion, or the presence or absence of the ultraviolet absorbent (hydroxyphenyl triazine, TINUVIN 479-DW, manufactured by BASF Corporation) was changed as shown in Table 1. Images were formed in the same manner as in Example 1 using the inks of Examples 2 to 11 and Comparative Examples 1 to 3. The proportion in Table 1 is represented in percent by mass.

Evaluation

Degree of Gloss

After the recorded matter obtained using the ink of each Example and Comparative Example was dried, the glossiness at a turning angle of 20 degrees was measured using a precision gloss meter (GM-26DS, manufactured by MURAKAMI COLOR RESEARCH LABORATORY CO., LTD.) and evaluated according to the following criteria. When the gloss value is 150 or more (rated C), the metallic luster can be visually confirmed.

Evaluation Criteria

A: 700 or higher

B: 450 to less than 700

C: 150 to less than 450

D: Less than 150

Chromaticity

After drying a 5 cm square solid image formed with the ink of each Example and Comparative Example in an amount of 30 pL per pixel with 300 dpi×300 dpi, the CIE L*a*b color coordinate of the dried solid image was measured by spectrophotodensitometer (X-Rite 938, manufactured by X-Rite) to evaluate chromaticity {(color vale (a* value) and (color vale (b* value)} based on the following evaluation criteria. The color by visual observation is natural silver color and practically usable when graded B or above.

Evaluation Criteria of Color Value (a* value)

A: $-1.5 \le a^* \le 1.5$

B: $-3.5 \le a^* \le -1.5$ or $1.5 < a^* \le 3.5$

C: $a^* < -3.5$ or $3.5 < a^*$

Evaluation Criteria of Color Value (b* value)

A: $-1.5 \le b^* \le 1.5$

B: $-3.5 \le b^* \le -1.5$ or $1.5 < b^* \le 3.5$

C: $b^* < -3.5$ or $3.5 < b^*$

Light Resistance

An inkjet printer (IPSiO GXe 5500 remodeled machine, manufactured by Ricoh Co., Ltd.) having a heating fan as a heating device was filled with the ink of each Example and each Comparative Example, and a solid image was formed on a white vinyl chloride sheet (IJ5331, manufactured by SUMITOMO 3M Limited) as a non-porous substrate and dried at 60 degrees C. for 1,800 seconds with the heating fan.

Each obtained recorded matter was subject to an exposure test by an Atlas Weather-O-Meter Ci35 A (Xenon light source) using a type S borosilicate glass for both the outer and inner filters with the black panel temperature set at 89 degrees C. until the exposure amount was 30 kJ/m² at 50 percent RH. The fading state of the image before and after the test was measured by X-Rite 938 (manufactured by X-Rite Inc.), and the light resistance (color difference ΔE*ab) was determined according to the following relation and light resistance was determined by the following criteria.

$$\Delta E^*ab = (\Delta L^{*2} + \Delta a^{*2} + \Delta b^{*2})^{1/2}$$

Evaluation Criteria
A: ΔE*ab≤5
B: 5<ΔE*ab≤10
C: 10<ΔE*ab≤20
D: 20<ΔE*ab

The evaluation results are shown in Table 1. As seen in Table 1, the image formed by the ink of Example had a natural silver color and demonstrated strong metallic luster, specularity (image clarity) and excellent yellowing resistance.

TABLE 1

| Component type | Ink composition | Example | | | | | | |
|---|---|---|---|---|---|---|---|---|
| | | 1 | 2 | 3 | 4 | 5 | 6 | 7 |
| Water | Deionized water | 38.4 | 38.4 | 38.4 | 38.4 | 38.4 | 38.4 | 38.4 |
| Water-soluble organic solvent | Propylene glycol (bp: 188° C.) | | | | | | 20 | |
| | 2,3-Butane diol (bp: 183° C.) | 20 | | | | | | 20 |
| | 1,2-Butane diol (bp: 194° C.) | | 20 | | | | | |
| | 1,3-Propanediol (bp: 214° C.) | | | 20 | | | | |
| | 1,2-Propanediol (bp: 187° C.) | | | | 20 | | | |
| | 1,3-Butane diol (bp: 203° C.) | | | | | 20 | | |
| | Diethylene glycol n-nutyl ether (bp: 230° C.) | 15 | 15 | 15 | 15 | 15 | 15 | 15 |
| Water-dispersible Resin | Polycarbonate-based urethane resin particle liquid dispersion A (D50: 20 nm) | 7.5 | 7.5 | 7.5 | 7.5 | 7.5 | 7.5 | 7.5 |
| | Acrylic resin emulsion (R-3380-E) | 2 | 2 | 2 | 2 | 2 | 2 | 2 |
| | Polyether-based urethane resin emulsion | | | | | | | |
| Pigment liquid dispersion | Silver colloid particle liquid dispersion 1: (D50: 5 nm) | 15 | 15 | 15 | 15 | 15 | 15 | |
| | Silver colloid particle liquid dispersion 2: (D50: 150 nm) | | | | | | | 15 |
| | Silver colloid particle liquid dispersion 3: (D50: 15 nm) | | | | | | | |
| | Silver colloid particle liquid dispersion 4: (D50: 60 nm) | | | | | | | |
| Ultraviolet absorbent | TINUVIN 479-DW | | | | | | | |
| Surfactant | Nonionic surfactant (EP-5035) | 2 | 2 | 2 | 2 | 2 | 2 | 2 |
| Fungicides | Proxel LV | 0.1 | 0.1 | 0.1 | 0.1 | 0.1 | 0.1 | 0.1 |
| Total of ink | | 100 | 100 | 100 | 100 | 100 | 100 | 100 |
| Evaluation result | Gloss | A | A | A | A | A | B | B |
| | Chromaticity (a* value) | B | B | B | B | B | B | B |
| | Chromaticity (b* value) | A | A | A | A | A | A | B |
| | Light resistance | A | A | A | A | A | A | B |

| Component type | Ink composition | Example | | | | Comparative Example | | |
|---|---|---|---|---|---|---|---|---|
| | | 8 | 9 | 10 | 11 | 1 | 2 | 3 |
| Water | Deionized water | 37.4 | 38.4 | 38.4 | 38.4 | 38.4 | 47.9 | 38.4 |
| Water-soluble organic solvent | Propylene glycol (bp: 188° C.) | | | | | | | |
| | 2,3-Butane diol (bp: 183° C.) | 20 | 20 | 20 | 20 | 20 | 20 | 20 |
| | 1,2-Butane diol (bp: 194° C.) | | | | | | | |
| | 1,3-Propanediol | | | | | | | |

TABLE 1-continued

|  |  | | | | | | | |
|---|---|---|---|---|---|---|---|---|
|  | (bp: 214° C.) 1,2-Propanediol (bp: 187° C.) 1,3-Butane diol (bp: 203° C.) | | | | | | | |
|  | Diethylene glycol n-butyl ether (bp: 230° C.) | 15 | 15 | 15 | 15 | 15 | 15 | 15 |
| Water-dispersible Resin | Polycarbonate-based urethane resin particle liquid dispersion A (D50: 20 nm) | 7.5 | 9.5 | 7.5 | 7.5 | | | |
|  | Acrylic resin emulsion (R-3380-E) | 2 | | 2 | 2 | 9.5 | | 2 |
|  | Polyether-based urethane resin emulsion | | | | | | 7.5 | |
| Pigment liquid dispersion | Silver colloid particle liquid dispersion 1: (D50: 5 nm) | 15 | 15 | | | 15 | 15 | 15 |
|  | Silver colloid particle liquid dispersion 2: (D50: 150 nm) | | | | | | | |
|  | Silver colloid particle liquid dispersion 3: (D50: 15 nm) | | | 15 | | | | |
|  | Silver colloid particle liquid dispersion 4: (D50: 60 nm) | | | | 15 | | | |
| Ultraviolet absorbent | TINUVIN 479-DW | 1 | | | | | | |
| Surfactant | Nonionic surfactant (EP-5035) | 2 | 2 | 2 | 2 | 2 | 2 | 2 |
| Fungicides | Proxel LV | 0.1 | 0.1 | 0.1 | 0.1 | 0.1 | 0.1 | 0.1 |
| Total of ink | | 100 | 100 | 100 | 100 | 100 | 100 | 100 |
| Evaluation result | Gloss | A | A | A | A | C | C | C |
|  | Chromaticity (a* value) | A | B | A | A | C | D | D |
|  | Chromaticity (b* value) | A | A | A | A | C | D | C |
|  | Light resistance | A | B | A | A | D | D | D |

Having now fully described embodiments of the present invention, it will be apparent to one of ordinary skill in the art that many changes and modifications can be made thereto without departing from the spirit and scope of embodiments of the invention as set forth herein.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink comprising:
   a water-soluble organic solvent;
   a glittery pigment having a median size of from 3 to 100 nm; and
   a polycarbonate-based urethane resin.
2. The ink according to claim 1, wherein the median size is from 15 to 100 nm.
3. The ink according to claim 1, wherein the median size is from 15 to 60 nm.
4. The ink according to claim 1, wherein the glittery pigment comprises silver.
5. The ink according to claim 1, wherein the water-soluble organic solvent comprises at least one member selected from the group consisting of 1,2-propanediol, 1,3-propanediol, 1,2-butane diol, 1,3-butane diol, and 2,3-butane diol.
6. The ink according to claim 1, further comprising an ultraviolet absorbent.
7. An image forming method comprising:
   discharging the ink of claim 1 to a recording medium to form an image thereon.
8. The image forming method according to claim 7, further comprising heating the recording medium.
9. The image forming method according to claim 7,
   wherein the recording medium includes a coating layer, and
   wherein a transfer amount of water onto a surface of the coating layer is from 1 to 10 ml/m$^2$ in a contact time of 100 ms as measured by a dynamic scanning liquid absorptometer.
10. An image forming device comprising:
    the ink of claim 1;
    a discharging device configured to discharge the ink of claim 1 to a recording medium; and a heating device configured to heat the recording medium onto which the ink has been discharged.

11. Image formed matter comprising:
a substrate; and
an image formed on the substrate with the ink of claim 1.

* * * * *